United States Patent Office 2,942,395
Patented June 28, 1960

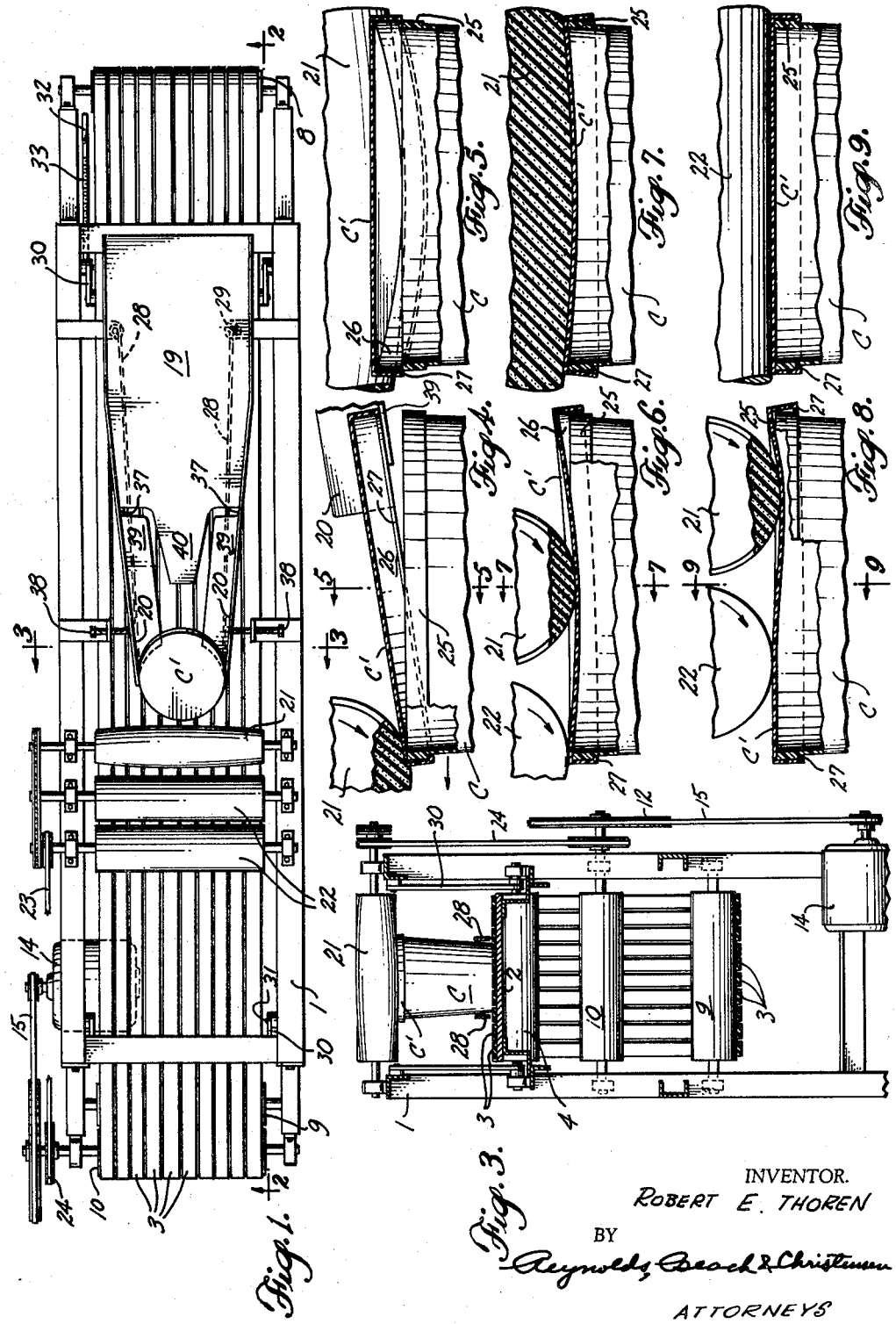

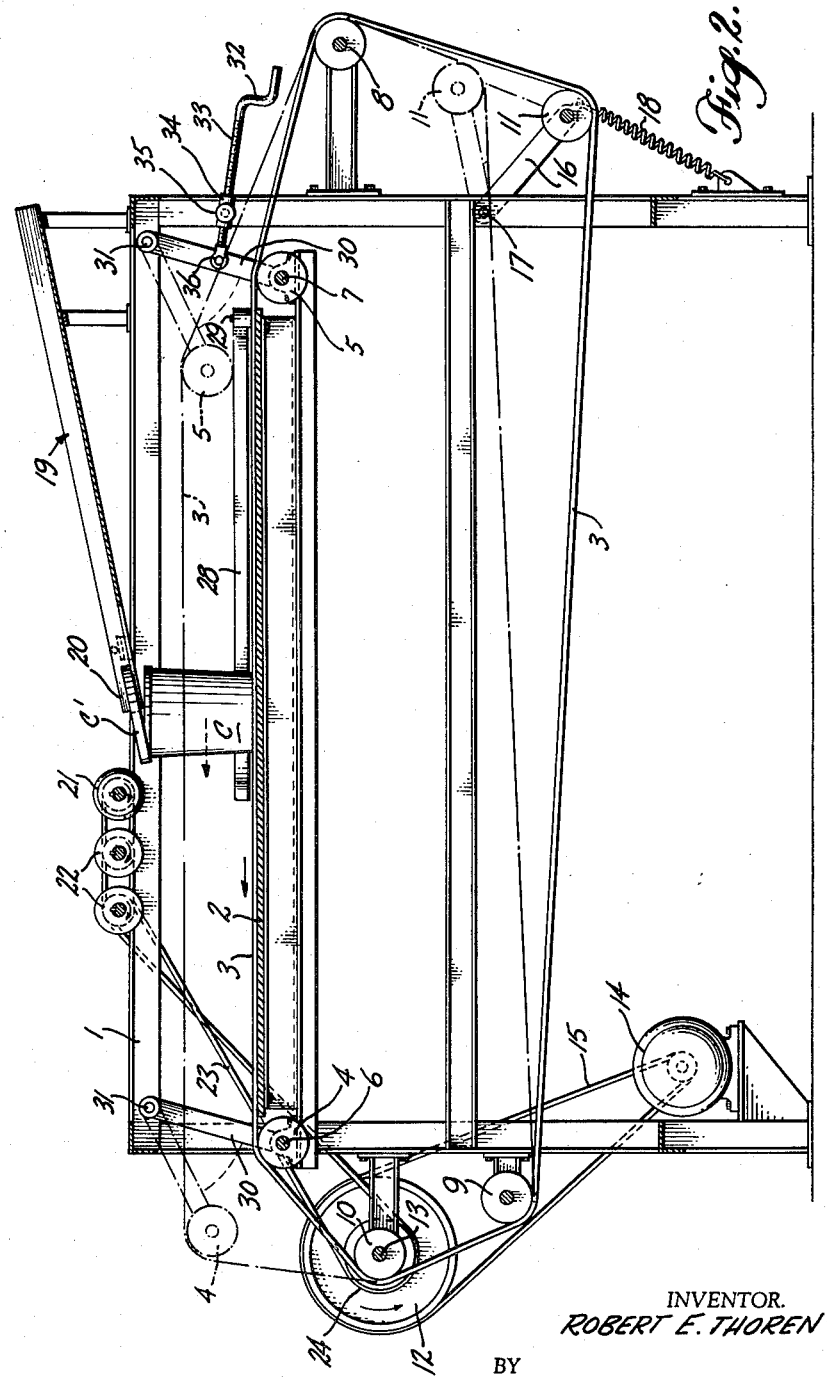

2,942,395

CONTAINER COVER APPLYING APPARATUS

Robert E. Thoren, Box 743, Moses Lake, Wash.

Filed May 6, 1958, Ser. No. 733,283

3 Claims. (Cl. 53—316)

This invention relates to apparatus for applying covers to containers and especially for supplying covers to and placing them on containers filled with food products. The apparatus is particularly adapted to apply flexible or pliable plastic covers to close the entire top of a flexible or pliable plastic container.

An important object of the present invention is to provide apparatus which will afford a supply of covers to be placed on containers as they are needed and which will effect application of the covers to the containers automatically.

Another object is to provide apparatus which will place covers on containers quickly and easily, yet positively and securely. In this way, considerable saving in hand labor is obtained.

Application of the cover to a container filled with food is accomplished smoothly by the present apparatus so that there is no risk of spilling liquid with which the container is filled. If the liquid is a food product, it will be kept sanitary and the equipment also will remain in a sanitary condition.

A further object is to enable such cover applying apparatus to be adjusted readily for placing covers on containers of different width, height and shape.

The container cover applying apparatus, in its preferred form, includes a cover supply chute inclined downwardly and forwardly toward a container transport conveyor. The height of such conveyor can be altered depending upon the height of the containers to be processed so that, when each container is moved beneath the lower end of the chute by the conveyor, it will pick a cover from the lower end of the chute. The container transport conveyor will then carry the container on beneath presser rolls which will lay the cover onto the top of the container, cup it slightly, and press it downward to secure it on the top of the container. The container on which the cover has thus been fitted will be carried to a discharge location by the transport conveyor.

Figure 1 is a plan view of the container cover applying apparatus.

Figure 2 is a longitudinal vertical section through the apparatus taken on line 2—2 of Figure 1.

Figure 3 is a vertical transverse section through the apparatus on line 3—3 of Figure 1.

Figure 4 is a fragmentary elevational view of a portion of the apparatus and the top of a container with parts broken away showing one step in the operation of applying a cover to a container, and Figure 5 is a corresponding sectional view taken on line 5—5 of Figure 4.

Figure 6 is a fragmentary elevational view of a portion of the apparatus and the top of a container with parts broken away showing a further step in the operation of applying a cover to a container, and Figure 7 is a corresponding sectional view taken on line 7—7 of Figure 6.

Figure 8 is a fragmentary elevational view of a portion of the apparatus and the top of a container with parts broken away showing still another step in the operation of applying a cover to a container, and Figure 9 is a corresponding sectional view taken on line 9—9 of Figure 8.

The various components of the container cover applying apparatus conveniently are mounted on a frame 1 which supports the container transport conveyor and cover supply chute at heights convenient to be serviced by an operator. The container transport conveyor may be composed of a platform 2 along the upper surface of which slide parallel transport belts 3 in a group. These transport belts bear on guide rolls 4 and 5 at opposite ends of the platform 2. These rolls are rotatively mounted on axles 6 and 7, respectively, carried by opposite ends of the platform support in positions such that the upper sides of the rolls will be coplanar with the upper surface of the platform 2.

The belts 3 also pass around guide rolls 8 and 9 suitably mounted in fixed position relative to the frame 1 and also around the powered roll 10 and the tightener roll 11, also mounted on the frame. The roll 10 is driven by the pulley 12 which rotates the axle 13 of roll 10. Such pulley is driven by any suitable drive mechanism such as the electric motor 14 connected to the pulley by belt 15. The tightener roll 11 is mounted on the swinging end of arms 16 which are pivotally mounted on the frame 1 by pivots 17. Springs 18, connected between the frame and the ends of arms 16, draw the arms in a direction to press the roll 11 against the belts 3, for maintaining them sufficiently taut.

Covers are supplied to the apparatus by a chute 19 which is inclined downwardly from the feed end of the apparatus. Covers may be placed in this chute manually or a suitable hopper can be provided for storage of a stack of covers from the bottom of which hopper individual covers can be ejected into the chute 19. Whether or not such a storage hopper is employed, the slope of chute 19 should be sufficiently great so that the covers will slide down the chute by gravity. Such downward movement of the covers is limited by engagement of the cover at the lower end of the chute with the opposite side walls 20 of the chute which converge toward its lower end.

Beyond the lower end of the chute 19 in the direction of movement of belts 3 is a cover applying roller 21. Beyond this roller in the direction of movement of belts 3 are one, and preferably two, retaining and pressing rollers 22. All of these rollers are driven in synchronism in the same directions and at substantially equal speeds by a belt 23, which is driven by pulley 24 mounted on axle 13. Since, as previously discussed, this axle is turned by motor 14 and drives belts 3, it is evident that the speed of rollers 21 and 22 will always be synchronized with the linear speed of belts 3, whether the machine is operated at high speed or at low speed.

While the present apparatus could be employed to apply covers of various types to a variety of containers, it is particularly useful for placing flexible and pliable plastic covers on relatively hard, although flexible, plastic containers. A representative type of container C and cover C' are shown in Figures 1 and 2 and in detail in Figures 4 to 9, inclusive. The container is shown as being of circular cross section and having an external bead 25 around its rim. The cover C' also is circular and has a downwardly extending flange or skirt 26 with an inturned lip 27 encircling its lower edge. The width of the flange is approximately equal to the width of the container bead 25 so that, when the cover is in place on the container, the lip 27 will be disposed below and extend inward closely beneath the lower edge of the bead 25.

It will be evident that application of a cover having such a flange and lip to a container presents a more difficult problem than simply laying a cover on a container. Application of such a cover to a container is made easier, however, because of the pliable nature and stretchability of the cover material. If pressure is exerted on the upper side of such a cover to cup it slightly, the flange portions of opposite sides will be bent inward relative to the main portion of the cover, whereas the flange portions at the opposite sides of the cover perpendicular to the first opposite sides will be bent outward relative to the principal surface of the cover. Advantage is taken of this characteristic of the cover in the operation of the present cover applying apparatus.

In applying a cover to a container, the container C, which may contain a food product, is placed on the transport conveyor formed by belts 3 at the right end of the apparatus as seen in Figure 2. As the container is moved to the left in that figure, it will engage the resilient centering strips 28 of spring material, preferably metal, overlying the belts, so that the container will be shifted laterally across the belts in one direction or the other during its advance as may be necessary to locate it precisely in the center of the transport conveyor at least by the time it reaches the roller 21. The centering strips 28 are supported in cantilever fashion by pivot blocks 29 at opposite sides of the transport conveyor and are swingable to position containers of different widths.

The covers are deposited in chute 19 manually or by suitable storage and feeding mechanism to slide down the chute. As each cover C' proceeds down the chute it will engage one or the other of the walls 20, if it is not exactly centered, and will be shifted transversely of the chute by such engagement until it lightly engages both walls at the lower end of the chute as shown in Figure 1. The cover will not slide out of the chute by itself because the walls 20 will be located to have a very slight, although sufficient, frictional engagement with the cover flanges to hold both the lowermost cover and all the covers behind it in the chute against the force of gravity which tends to slide them down the chute. Since the covers are very light, the action of gravity on them will be small.

The container C moved by the conveyer belts 3, and the cover C' held by the opposite walls 20 at the lower end of the chute 19, will be located relatively as shown in Figure 2 so that the lowermost portion of the cover principal surface at the left will be at the same level at the upper edge of the container rim or slightly below it. As the container is moved to the left by the transport conveyor, therefore, its rim will pass beneath the lower end of chute 19 and the lowermost cover in such chute until the forward portion of the container rim engages the forward portion of the cover skirt. As the conveyor continues to move the container, the friction between the bottom of the container and such conveyor will be sufficiently greater than the friction between the cover and the chute sides 20 that the moving container will draw the cover out of the chute Shortly after the container has thus started to draw the cover out of the chute, the leading portion of the container and of the cover will engage the periphery of roll 21 as shown in Figures 4 and 5. At least the periphery of this roller is made of readily yieldable material such as sponge rubber. The relative elevations of such roller and the container are such that it should be necessary for the material of the roller to be deformed slightly by passage of the stiff leading portion of the container beneath it as shown in Figure 4. It is apparent from Figures 1, 2, 3 and 4 that the central portion of roller 21 bulges and such bulge should be sufficient so that at least its central portion will thus be deformed by the container.

While the belt 23 turns roller 21 in the direction indicated by the arrow in Figure 2 so that the bottom peripheral portion of the roller is moving in the same direction as the conveyor belts 3, it is preferred that the size of pulley 24 be selected so that the lower portion of the periphery of roller 21 will be moving to the left slightly slower than the belts 23. As the container C is moved by the belts, therefore, the cover of the container will be moved slightly faster than the periphery of roller 21 which it engages. Consequently, the roller will have a smoothing or ironing action on the cover which will tend to draw the leading portion of the cover firmly against the leading portion of the container rim, and the cover flange 26 and lip 27 will thus embrace the forward portion of the container bead 25.

As movement of the container C to the left by belts 3 progresses toward the position shown in Figures 6 and 7, a portion of the cover unsupported by the stiff side of the container will pass beneath the roller 21. The deformation of the roller effected by movement of the stiff side of the container beneath it will therefore be relaxed and, in again assuming its bulged shape, the roller will depress the central portion of the pliable cover as shown in Figure 6. The result of this depression of the principal surface of the cover, as stated previously, is to cause the front and rear portions of the flange 26 to tend to bend inward, while the side portions of the flange 26 will tend to bend outward. This tendency is illustrated in Figure 7.

It will be evident that the tendency of the side portions of flange 26 to be deflected outward, as described, will facilitate movement of the side flange and lip portions downward over the container bead 25. As movement of the container progresses farther to the left to the position indicated in Figures 8 and 9 relative to roll 21, the central depression of the cover will cause the rear portion of the flange to be deflected outward as shown in Figure 8, so that the rear portion of lip 27 can slide down over the bead 25. When the rear wall of the container passes the roller 21, its periphery will be deformed upward again somewhat by the stiffness of the container wall and the cover will be pressed firmly downward against the rim of the container.

The presser roller 22 adjacent to bulged roller 21 should be located sufficiently close to the bulged roller that the leading side of the container will be engaged by it when the bulged roller 21 is engaged with the generally central portion of the cover. Such engagement by the roller 22 as shown in Figure 6 will insure that the forward portion of the cover is held down on the top of the container and, in fact, is pressed firmly in place. As movement of the container continues to the position of Figure 8, the roller 22 will continue to press the applied cover firmly down on the container.

Preferably, the peripheries of rollers 22 are fairly soft so that they yield and exert a firm, resilient pressure on the cover. Also, it is preferred that these rollers, like 21, be driven at a speed such that the periphery of the roller on the bottom is moving slightly slower than the belt 3 to afford a smoothing or ironing action on the cover. When the container has progressed to the left beyond the roller or rollers 22, therefor, the cover will have been pressed firmly into place on the container with the lip 27 engaged beneath the bottom of container bead 25, so that the container can be removed from the conveyor and packed.

It is desirable for a cover applying apparatus of the type described to be capable of use for applying covers to containers of different widths and heights. The apparatus can be used for applying covers to containers of different heights by supporting the platform 2 so that its elevation relative to rollers 21 and 22 can be varied. For this purpose, the platform can be supported by links 30 at its opposite ends, the upper ends of which are mounted on the frame 1 by pivots 31, and the lower ends of which are pivotally secured to the platform by axles 6 and 7 of rollers 4 and 5, or by pivotal connections concentric with the axes of such rollers. The height of the platform can then be adjusted by rotating crank 32 which is formed on the end of threaded rod 33. This rod is threaded into nut 34 supported by swivel 35 on the frame, and the end of the screw seats in a lug 36 pivotally mounted on one of the links 30. As the crank 32 is rotated in one direction, the link 30 at the right will be swung from the solid line position shown in Figure 2 toward the broken line position. Because the links 30 form a parallel linkage support for the platform 2, the entire platform will be moved up or down through positions parallel to the plane in which pivots 31 are located. Rotation of the crank 32 in the opposite direction will, of course, lower the platform. As the platform is raised, thereby simultaneously elevating the upper stretches of belts 3, the belt tightener roll 11 will be rasied against the force of springs 18 and links 16 will be swung upward. Conversely, when the platform is lowered, the springs 18 will draw the tightener roll 11 downward to maintain the conveyor belts 3 reasonably taut.

It is not necessary to make any adjustment in the container transport system or in the rollers 21 and 22 to accommodate containers of different widths. It is necessary, however, to adjust the spacing of the chute walls 20 if covers of different widths are to be used. The sides 20 of the chute can flex about locations 37 in being swung inward or outward, and the spacing of the sides can be regulated by rotating screws 38 in one direction or the other. If the material of the walls 20 is resilient and tends to move outward, screws 38 can simply exert inward pressure on the walls. Also, the screws on opposite sides of the chute can be adjusted differentially as necessary to center the opening between the walls relative to the strips 28 and the roller 21.

In order to support the covers in the chute 19 despite great variation in the spacing of the walls 20, each of such walls includes a bottom flange 39 on which the edge portions of a cover may rest. While these edge flanges could be tapered toward the ends of the walls, an alternative arrangement is to provide a tongue 40 extending from the bottom of the principal portion of the chute between the flanges 39. In addition, to increase the resilience of the tips of walls 20, it is desirable that the adjusting screws 38 be spaced a considerable distance from the ends of the walls, as shown in Figure 1. Also, it is desirable for the portions of the walls 20 between screws 38 and the tips of the walls be separate from the flanges 39 so that the wall tips constitute light spring fingers which will yield readily to release a cover when it is engaged by a container moved beneath it by the transport belts 3 in the manner described above.

I claim as my invention:

1. A container cover applying apparatus comprising container transport means, a roller bulged generally centrally between its ends, located above said container transport means, mounted for rotation about a substantially horizontal axis extending transversely of the direction of movement of said container transport means and engageable by the top of a container progressively from one side of the container top to its opposite side while such container is moved by said container transport means, for pressing a cover down onto the container.

2. A container cover applying apparatus comprising container transport means, a roller having a soft, resilient periphery bulged generally centrally between its ends, located above said container transport means, mounted for rotation about a substantially horizontal axis extending transversely of the direction of movement of said container transport means and engageable by the top of a container progressively from one side of the container top to its opposite side while such container is moved by said container transport means, for pressing a cover down onto the container.

3. A container cover applying apparatus comprising substantially horizontal container transport means, and a plurality of rollers located above said container transport means, mounted for rotation, respectively, about parallel axes disposed substantially in the same horizontal plane and extending transversely of the direction of movement of said container transport means and engageable by the top of a container moved by said container transport means beneath said rollers, the first of said rollers engaged by such a container being bulged generally centrally between its ends.

References Cited in the file of this patent
UNITED STATES PATENTS

| | | |
|---|---|---|
| 2,041,891 | White | May 26, 1936 |
| 2,319,213 | Davies | May 18, 1943 |
| 2,352,761 | Bell | July 4, 1944 |
| 2,532,900 | Enkur et al. | Dec. 5, 1950 |
| 2,669,377 | Van Poolen et al. | Feb. 16, 1954 |
| 2,734,673 | Hazel et al. | Feb. 14, 1956 |
| 2,769,292 | Day | Nov. 6, 1956 |
| 2,821,823 | Wahl | Feb. 4, 1958 |